(No Model.)

H. W. KRAMER.
WHEEL HAY RAKE.

No. 386,593. Patented July 24, 1888.

WITNESSES:

INVENTOR:
H. W. Kramer
BY Munn & Co.
ATTORNEYS.

UNITED STATES PATENT OFFICE.

HENRY W. KRAMER, OF NEWTONVILLE, INDIANA.

WHEEL HAY-RAKE.

SPECIFICATION forming part of Letters Patent No. 386,593, dated July 24, 1888.

Application filed May 16, 1887. Serial No. 238,398. (No model.)

*To all whom it may concern:*

Be it known that I, HENRY W. KRAMER, of Newtonville, in the county of Spencer and State of Indiana, have invented a new and Improved Wheel Hay-Rake, of which the following is a full, clear, and exact description.

The object of my invention is to provide a practical hay-rake adapted for carrying its load to a barn or stack before discharging it, thus avoiding the necessity of loading the hay upon wagons, as is now the practice; and the invention consists of the construction, combination, and arrangement of parts, all as hereinafter described and claimed.

Reference is to be had to the accompanying drawings, forming a part of this specification, in which similar letters of reference indicate corresponding parts in both figures.

Figure 1:
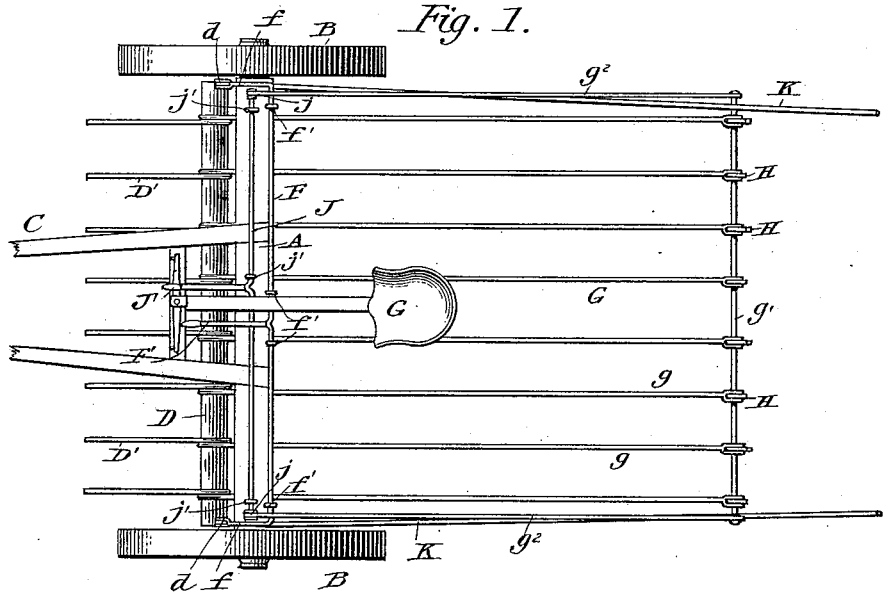
Figure 2:
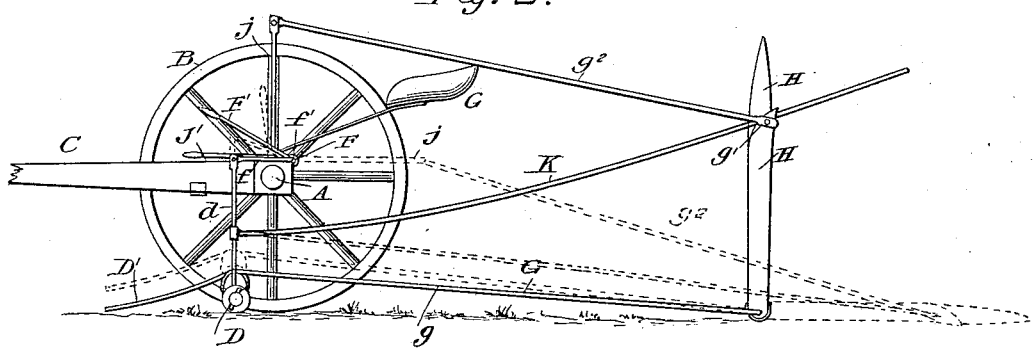

Figure 1 is a plan view of my new and improved hay-rake, and Fig. 2 is a side elevation of the same, one wheel being removed, and showing the parts in full lines in position for taking the load and in dotted lines for discharging the load.

A represents a long axle provided with the wheels B B and with the thills C.

D represents the rake-head, attached by the rods $d\ d$ to the arms $f f$ of the rod F, held upon the axle A in the keepers or staples $f' f'$, in which said rod is free to turn, and this rod is provided near the seat G with the lever F' for turning the rod and elevating or depressing the arms $f$ for raising and lowering the rake-head D, as indicated in full and dotted lines in Fig. 2.

Attached to the rake-head D are the rake-teeth D', which slope downward to gather the hay from the ground. These teeth run in contact with the ground when the rake-head is lowered to the position shown in full lines in Fig. 2; but when raised to the position shown in dotted lines said teeth clear the ground.

Back of the rake-head is the frame G, composed in this instance of numerous wires $g$. This frame is for receiving the hay gathered up by the teeth D', which hay is forced over the rake-head D upon the frame G by the pressure of accumulation. At the rear ends of the rods $g$ are pivoted the arms H. These are joined together by the rod $g'$, which is connected by the rods $g^2\ g^2$ to the arms $j j$ of the rod J, connected to the axle A by the staples or keepers $j' j'$, in which it is free to turn. The rod J is provided near the seat G with the lever J', by which said rod may be turned for lowering the arms $j$ and pivoted arms H to horizontal position, as shown in dotted lines in Fig. 2, the position they must assume to discharge the load. By pressing forward the lever J' the arms $j$ and the pivoted arms H will assume a vertical position, as shown in full lines in Fig. 2, and retain the load of hay upon the frame G, so that by lifting the rake-head D and teeth D' from the ground the load may be carried by the rake to the barn or stack.

To prevent the hay on the frame G from working off at the sides of the frame, I provide the rake with the side rods, K K. These are attached in this instance to the rods $d$ and reach back to the cross-piece $g'$; but in place of these rods I may use other means for preventing the hay from working off from the frame G. These rods K also act as springs to throw back the arms H when the lever J' is elevated.

Having thus described my invention, what I claim as new, and desire to secure by Letters Patent, is—

The rake-head D, provided with the rake-teeth D', rear rods, $g$, attached to the rake-head, and the arms H, hinged to the rear end of the rods $g$, in combination with the side spring-rods, K, levers J' and $j$, and the rods $g^2$, connecting the lever $j$ with one of the arms H, substantially as described.

HENRY W. KRAMER.

Witnesses:
GEORGE WANDEL,
JOHN BIEDENKOPF.